(12) United States Patent
Habel et al.

(10) Patent No.: US 7,518,281 B2
(45) Date of Patent: Apr. 14, 2009

(54) ELECTRIC MOTOR WITH A HOUSING FOR AT LEAST TWO CARBON BRUSHES

(75) Inventors: Winfried Habel, Leinfelden-Echterdingen (DE); Otto Baumann, Leinfelden-Echterdingen (DE); Siegfried Fehrle, Leinfelden-Echterdingen (DE); Andre Ullrich, Filderstadt-Bernhausen (DE); Michael Weiss, Stuttgart (DE); Hardy Schmid, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 432 days.

(21) Appl. No.: 10/511,286

(22) PCT Filed: May 30, 2003

(86) PCT No.: PCT/DE03/01761

§ 371 (c)(1),
(2), (4) Date: Dec. 5, 2005

(87) PCT Pub. No.: WO2004/004094

PCT Pub. Date: Jan. 8, 2004

(65) Prior Publication Data

US 2006/0087196 A1 Apr. 27, 2006

(30) Foreign Application Priority Data

Jun. 26, 2002 (DE) .................. 102 28 493

(51) Int. Cl.
*H02K 5/14* (2006.01)

(52) U.S. Cl. .................. 310/239; 29/596; 29/732
(58) Field of Classification Search .......... 310/239; 29/732
See application file for complete search history.

(56) References Cited

U.S. PATENT DOCUMENTS

| 4,293,789 A | 10/1981 | King |
| 4,311,936 A * | 1/1982 | Ozaki et al. .......... 310/242 |
| 5,019,741 A | 5/1991 | Fukui et al. |

FOREIGN PATENT DOCUMENTS

| DE | 101 53 574 A1 | 8/2003 |
| EP | 0 706 255 A | 4/1996 |
| GB | 2 384 918 A | 8/2003 |

* cited by examiner

*Primary Examiner*—Renee S Luebke
*Assistant Examiner*—Jason Collins
(74) *Attorney, Agent, or Firm*—Michael J. Striker

(57) ABSTRACT

An electric motor includes carbon brushes (5) disposed in a holder (6) that are pressed by means of a spring force (7) in a radial direction against a jacket face of a cylindrical collector (4) that is fixed to an armature shaft (2) of the motor. The holder (6) for the carbon brushes (5) can be removed from the motor with little effort as a result of a provision of covering means (11, 12) that cover a pivot bearing (3) of the armature shaft (2) to protect it against the entry of dirt on a side of the covering means (11, 12) facing the holder (6) for the carbon brushes (5), provided with one or more chamfers (14, 15) in such a way that the carbon brushes (5) slide over the covering means (11, 12) as the holder (6) is being pulled off and that the carbon brushes (5) thereby are thrust radially outward counter to the spring force (7).

5 Claims, 4 Drawing Sheets

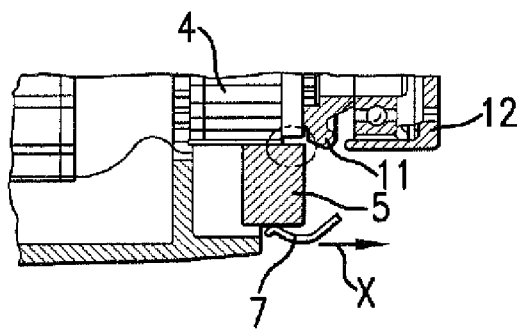
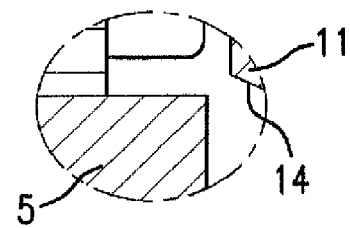
FIG.2a-1  FIG.2a-2
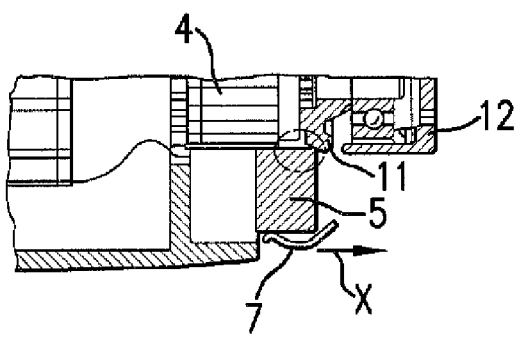
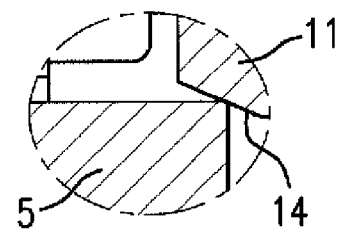
FIG.2b-1  FIG.2b-2
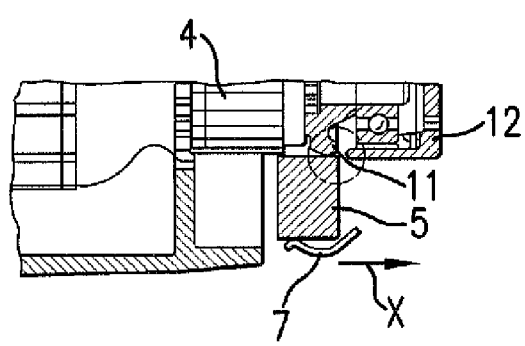
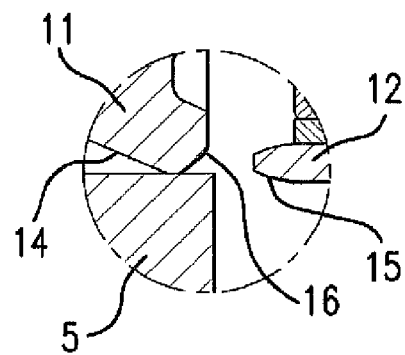
FIG.2c-1  FIG.2c-2

ELECTRIC MOTOR WITH A HOUSING FOR AT LEAST TWO CARBON BRUSHES

PRIOR ART

The present invention relates to an electric motor with a holder for at least two carbon brushes, which are pressed by spring force in the radial direction against the jacket face of a cylindrical collector fixed to the armature shaft of the motor.

Mechanically commutated electric motors typically have a carbon brush contact, of the kind also described for instance in German Patent Application 101 53 574.0, which was not yet published by the priority date of the present application. In this application cited, whose subject is the rotatable bearing of the holder for the carbon brushes, no provisions that make it as simple as possible to change carbon brushes are disclosed. The carbon brushes of an electric motor, which are exposed to wear, must be replaced after a certain number of hours of operation. Such a change of carbon brushes is often impossible because of tight space conditions in the surroundings of the electric motor, such as in power tools. Therefore the entire holder of the carbon brushes must often be removed so that the carbon brushes can be replaced outside the device. It is therefore the object of the invention to disclose an electric motor of the type defined at the outset in which the holder for the carbon brushes can be removed as simply as possible.

ADVANTAGES OF THE INVENTION

The aforementioned object is attained with the characteristics of claim 1, in that the holder with the carbon brushes can be pulled off the collector in the axial direction of the armature shaft by way of a pivot bearing that holds the armature shaft, and that means which cover the pivot bearing against the entry of dirt are provided, on their side toward the holder with the carbon brushes, with one or more chamfers that extend in such a way that the carbon brushes slide over it as the holder is being pulled off and in the process are thrust radially outward counter to the spring force.

Despite means that protect the pivot bearing against the entry of dirt (such as material abraded from the carbon brushes, or drillings), the invention makes simple removal of the holder with the carbon brushes possible.

Advantageous refinements of the invention are disclosed in the dependent claims.

To protect the pivot bearing against becoming soiled, an armature disk may be disposed between the pivot bearing and the collector, and/or a bearing dome may be placed on the pivot bearing. Unhindered pulling off of the holder with the carbon brushes over the pivot bearing is made possible by providing that the side of the armature disk and/or of the bearing dome oriented toward the collector is provided with a chamfer extending rectilinearly or in curved form.

DRAWING

The invention is described in further detail below in conjunction with two exemplary embodiments shown in the drawing. Shown are:

FIG. 1b is a magnified portion of the fragmentary longitudinal section depicted in FIG. 1a;

FIGS. 2a-1 through 2e-1 depict various positions of a carbon brush as the holder for the carbon brushes is being pulled off from the armature shaft of the motor;

FIGS. 2a-2 through 2e-2 depict magnified portions of the various positions depicted in FIGS. 2a-1 through 2e-1, respectively;

DESCRIPTION OF EXEMPLARY EMBODIMENTS

Figure 1A:
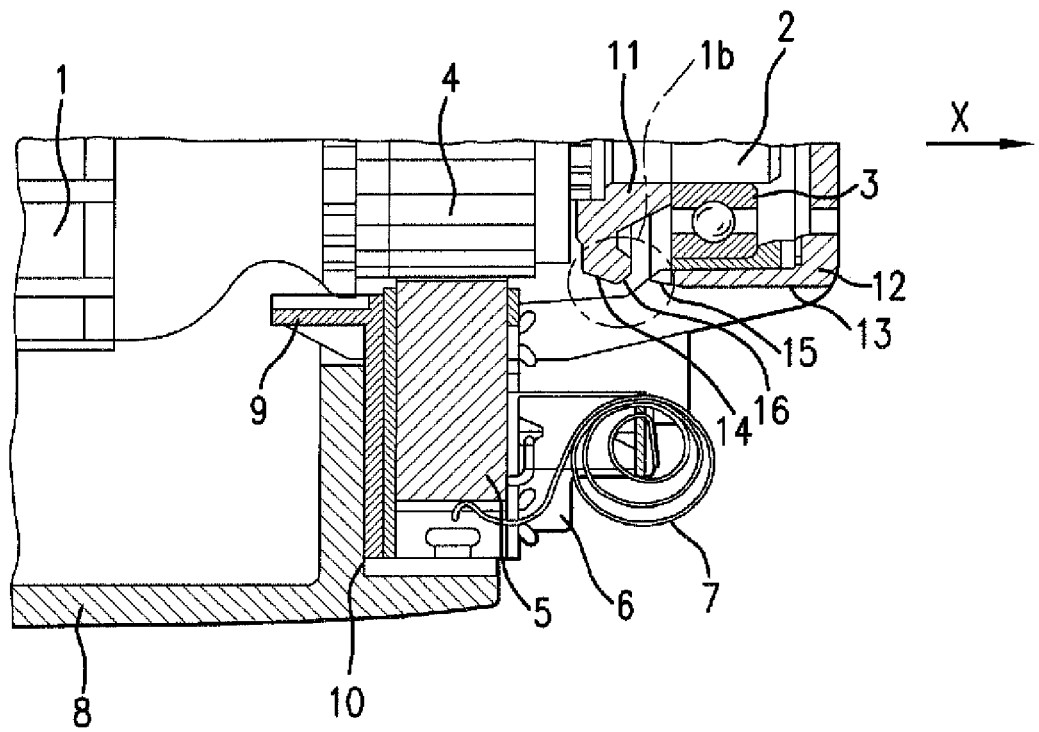
FIG. 1a is a fragmentary longitudinal section through an electric motor, with a carbon brush holder disposed on its collector and with means of a first embodiment for protecting the armature shaft pivot bearing from soiling.

In FIG. 1a, a portion of an electric motor of the kind used preferably in hand-operated electrical tools, is shown. Since the motor is constructed rotationally symmetrically with respect to its longitudinal axis, only half of the electric motor is shown in FIG. 1a. In a known manner, the motor has a rotatable armature 1, whose armature shaft, on its end remote from the armature 1, is supported in a pivot bearing 3. A cylindrical collector 4 which rotates with the armature shaft 2 is disposed on the armature shaft 2, between the armature 1 and the pivot bearing 3 for the armature shaft 2. The collector 4 is provided with electrical contact by at least two carbon brushes, of which only one carbon brush 5 is shown in the sectional view in FIG. 1a. The carbon brushes have the function of establishing an electrical connection from an external power connection to the collector of the motor. The carbon brushes 5 are disposed in a holder 6 and are pressed by a spring force in the radial direction against the jacket face of the cylindrical collector 4. The spring force is exerted by a spring 7, which rests on the face end, remote from the collector 4, of the carbon brushes 5 and exerts a contact pressure in the direction of the jacket face of the collector 4. The holder 6 for the carbon brushes 5 is releasably fixed to the housing 8 of the motor. The releasable fixation is preferably effected by means of a detent element 9, which is present in the holder 6 and can be snapped into the housing 8. A special receptacle chamber 10, into which the holder 6 for the carbon brushes 5 is insertable, may be integrally formed onto the housing 8.

Figure 1B:
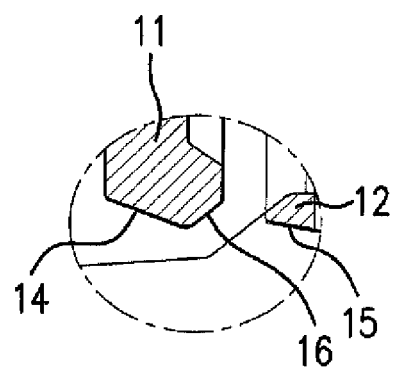

An armature disk 11 is disposed on the armature shaft 2, between the collector 4 and the pivot bearing 3. This armature disk 11 serves to protect the pivot bearing 3 for the armature shaft 2 against the entry of material abraded from the carbon brushes 5 as well as from particles (such as drilling dust and drillings), which are aspirated in the process of operating an electrical power tool. This armature disk 11 has a larger diameter than the collector 4 and therefore protrudes radially past the collector 4, as is readily apparent from the magnified portion of the FIG. 1a fragmentary longitudinal section that is depicted in FIG. 1b.

As a rule, the pivot bearing 3 of a motor is covered by a bearing dome 12. The bearing dome 12 is a caplike structure, communicating with the housing 8, which covers the pivot bearing 3 and the armature shaft, placed in the pivot bearing, on the face end remote from the collector and which, with a preferably flattened, cylindrical wall 13, coaxially surrounds the pivot bearing 3.

Figures 1, 2D:
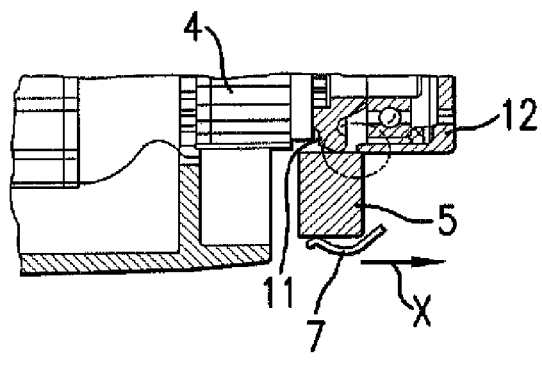
Figures 2, 2D:
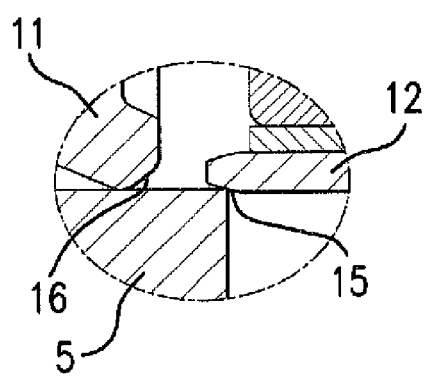
Figures 1, 2E:
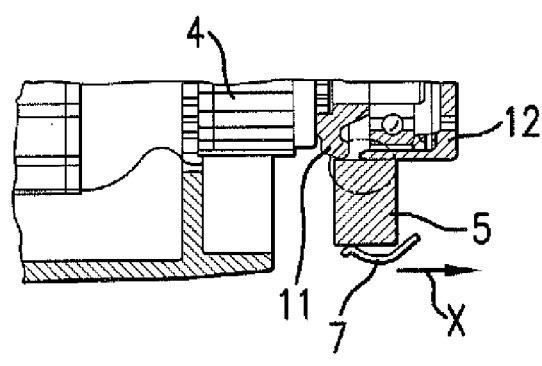
Figures 2, 2E:
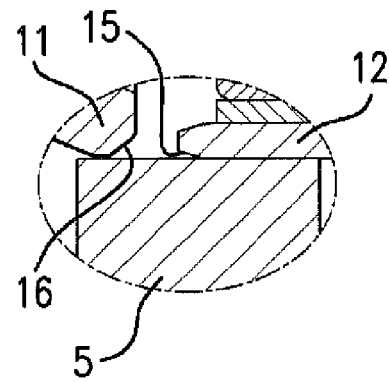

As already described above, the holder 6 with the carbon brushes 5 is releasably secured to the housing 8. If the holder 6 is to be removed from the motor so that the carbon brushes can be changed, then the detent element 9 of the holder 6 is released, and the holder is pulled off the collector 4 in the axial direction (direction of the arrow X) of the armature shaft 2. In FIGS. 2a-1 through 2e-1, five different positions of the carbon brush 5 are shown during the process of pulling off the holder 6 for the carbon brushes 5. For the sake of simplicity, each of the FIGS. 2a-1 through 2e-1 shows only one carbon brush 5 with the spring 7 holding it down, without the holder 6. FIGS. 2a-2 through 2e-2 depict magnified portions of the various positions depicted in FIGS. 2a-1 through 2e-1, respectively.

In the view shown in FIGS. 2a-1 and 2a-2, the holder is moved in the axial direction, so that the brushes 5 slide over the collector 4 in the direction of the armature disk 11. Finally, the carbon brushes 5 meet the armature disk 11, which protrudes radially past the collector 4. This situation is shown in FIGS. 2b-1 and 2b-2. Because of the larger diameter of the armature disk 11 in comparison with the collector 4, this would prevent the holder 6 with the carbon brushes 5 from being pulled farther in the X direction and thus from being removed entirely from the motor. Because the armature disk 11, on its side toward the carbon brushes 5, is provided with a chamfer 14, which decreases from the outer diameter of the armature disk 11 to the carbon brushes 5, the carbon brushes slide along this chamfer 14 over the armature disk 11, and in the process the carbon brushes 5 are thrust radially outward counter to the force of the spring 7.

The enlarged details of the magnified portions shown in FIGS. 2a-2 through 2e-2 depict the position of the carbon brushes 5 relative to the armature disk 11 and to the bearing dome 12. FIGS. 2c-1 and 2c-2 show the position of the carbon brushes 5 once they have been slipped over the chamfer 14 of the armature disk 11 as far as the outermost point of the armature disk 11. After a further forward motion in the X direction of the holder 6 with the carbon brushes 5, the carbon brushes slide over the topmost point of the armature disk 11, until they meet the bearing dome 12. This situation is shown in FIGS. 2d-1 and 2d-2. The bearing dome 12, or more specifically the face end toward the carbon brushes 5 of the cylindrical wall 13 of the bearing dome 12, is likewise provided with a chamfer 15. This chamfer of the bearing dome 12 decreases in diameter from the outermost diameter of the cylindrical wall 13 in the direction of the carbon brushes 5. Thus even a bearing dome 12 that has a somewhat larger diameter than the armature disk 11 is no hindrance to the continued motion of the holder 6 with the carbon brushes 5. That is, the carbon brushes 5 slide over the chamfer 15 of the bearing dome and are thrust outward, counter to the force of the spring 7, until the carbon brushes 5 finally rest on the surface of the cylindrical wall 13 of the bearing dome 12. Finally, the holder 6 with the carbon brushes 5 disposed in it can be pulled all the way off, over the surface of the cylindrical wall 13 of the bearing dome 12. The chamfers 14 and 15 on the armature disk 11 and bearing dome 12 can extend rectilinearly, as shown in the drawings, or can have a curved course.

So that it is also possible to slip the holder 6 with the carbon brushes 5 on over the armature disk 11 as far as the collector 4 without hindrance, as well, the armature disk 11 is provided, on its side toward the bearing dome 12, with a chamfer 16, which enables the carbon brushes 5 to be thrust without hindrance from the bearing dome 12 over the armature disk 11 onto the collector 4. This chamfer 16 on the armature disk 11 is actually required only whenever the outer diameter of the bearing dome 12 is less than the outer diameter of the armature disk 11. This is because only for that case would the armature disk 11 be a hindrance as the holder 6, with the carbon brushes 5, is being slipped on in the direction of the collector 4.

In a departure from the exemplary embodiment described above, it is possible for only an armature disk 11 or only a bearing dome 12 to be provided for protecting the pivot bearing 3. In that case, only one chamfer 14 or 15, on the armature disk 11 or on the bearing dome 12, respectively, is necessary.

Figure 3A:
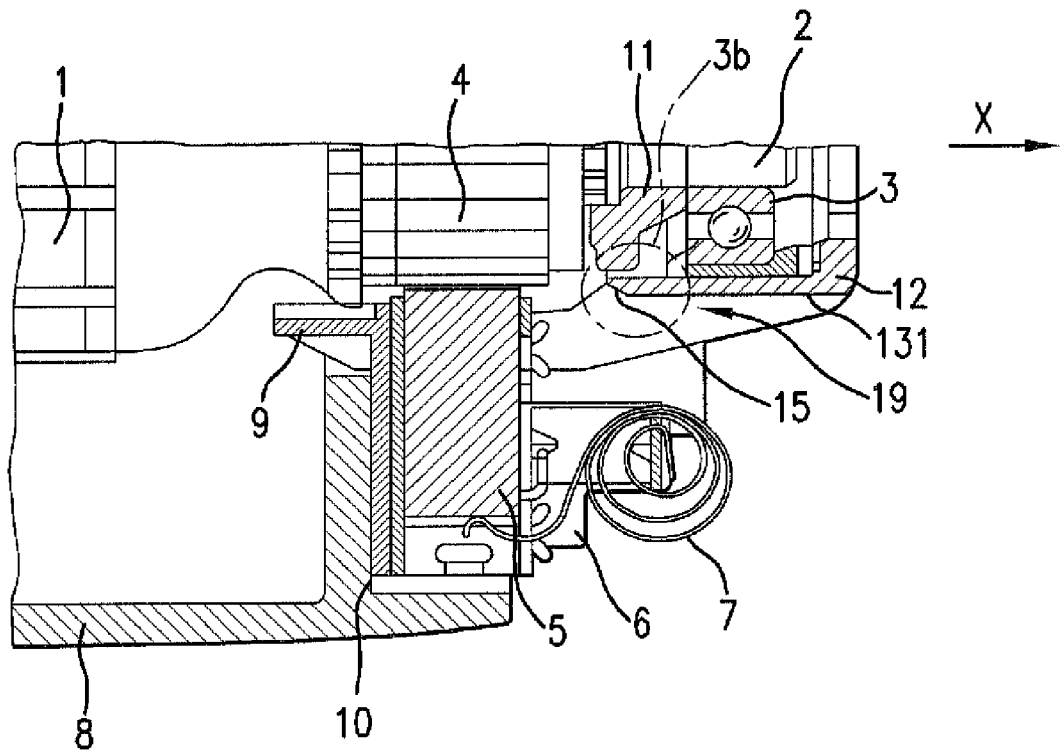
FIG. 3a depicts a fragmentary longitudinal section through an electric motor, with a carbon brush holder disposed on its collector and with means of a second embodiment for protecting the armature shaft pivot bearing from soiling.
Figure 3B:
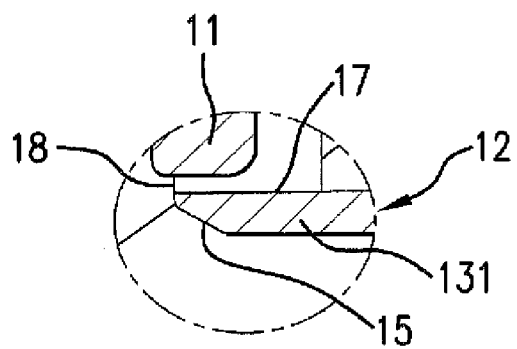
FIG. 3b is a magnified portion of the FIG. 3a fragmentary longitudinal section.

The exemplary embodiment shown in FIG. 3a, including a magnified portion shown in FIG. 3b, differs from the exemplary embodiments shown in FIGS. 1a, 1b, and 2a-1, 2a-2 through 2e-1. 2e-2 only in the design of the means that protect the pivot bearing 3 against dirt. All the other details of the exemplary embodiment in FIGS. 3a, 3b correspond to those of the exemplary embodiment of FIGS. 1a, 1b, and 2a-1, 2a-2 through 2e-1. 2e-2 and are identified by the same reference numerals. In the exemplary embodiment of FIGS. 3a and 3b, the bearing dome 12 protrudes, with its cylindrical wall 131, axially in the direction of the collector 4, past the armature disk 11. A chamfer 15 over which the holder 6 can slide is therefore required only on the face end of the cylindrical wall 131 of the bearing dome 12 oriented toward the holder 6 having the carbon brushes 5.

The wall 131 of the bearing dome 12, which wall extends in the axial direction and protrudes past the armature disk 11, moreover has the advantage that the gap between it and the armature disk 11 can be kept quite small, which leads to increased leakproofness of the pivot bearing 3. The elongation of the cylindrical wall 131 in the direction of the collector 4 has the effect of carrying cooling air directly to the collector 4 and to the carbon brushes 5.

The invention claimed is:

1. An electric motor comprising a holder (6) for at least two carbon brushes (5), which by means of a spring force (7) are pressed in a radial direction against a jacket face of a cylindrical collector (4) fixed to an armature shaft (2) of the motor, and a pivot bearing (3) that holds the armature shaft (2), characterized in that the holder (6) can be pulled off together with the carbon brushes (5) from the collector (4) in the axial direction of the armature shaft (2); and that covering means (11, 12) for covering the pivot bearing (3) to protect it against entry of dirt are disposed on a side of the covering means (11, 12) facing the holder (6) for the carbon brushes (5), provided with one or more chamfers (14, 15) in such a way that the carbon brushes (5) slide over the covering means (11, 12) as the holder (6) is being pulled off and that the carbon brushes (5) thereby are thrust radially outward counter to the spring force (7).

2. The electric motor of claim 1, characterized in that disposed between the collector (4) and the pivot bearing (3) on the armature shaft (2) is an armature disk (11); and that an end of the armature disk (11) protruding radially past the collector (4) is provided with a chamfer (14), over which the carbon brushes (5) slide as the holder (6) is being pulled off and thereby are thrust radially outward counter to the spring force (7).

3. The electric motor of claim 1, characterized in that the pivot bearing (3) is covered by a bearing dome (12), which on its face end toward the holder (6) for the carbon brushes (5) is provided with a chamfer (15), over which the carbon brushes (5) slide as the holder (6) is being pulled off and in the process are thrust radially outward counter to the spring force (7).

4. The electric motor of claim 1, characterized in that disposed between the collector (4) and the pivot bearing (3) on the armature shaft (2) is an armature disk (11); that the pivot bearing (3) is covered by a bearing dome (12), which protrudes past the armature disk (11) in the direction of the collector (4); and that the bearing dome (12), on its face end toward the holder (6) for the carbon brushes (5), is provided with a chamfer (15), over which the carbon brushes (5) slide as the holder (6) is being pulled off and in the process are thrust radially outward counter to the spring force (7).

5. The electric motor of one of claim 2, characterized in that the chamfer (14, 15) extends rectilinearly.

* * * * *